United States Patent
Reynolds et al.

(10) Patent No.: US 11,590,851 B2
(45) Date of Patent: *Feb. 28, 2023

(54) ELECTRIC VEHICLE CHARGING SYSTEM

(71) Applicant: CyberSwitchingPatents, LLC, San Jose, CA (US)

(72) Inventors: Charles H. Reynolds, Morgan Hill, CA (US); Ronald L. Silorio, Pittsburg, CA (US)

(73) Assignee: CyberSwitchingPatents, LLC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,561

(22) Filed: Sep. 15, 2020

(65) Prior Publication Data

US 2021/0001734 A1 Jan. 7, 2021

Related U.S. Application Data

(63) Continuation of application No. 15/222,813, filed on Jul. 28, 2016, now Pat. No. 10,850,627.

(Continued)

(51) Int. Cl.
*B60L 53/14* (2019.01)
*B60L 53/30* (2019.01)
(Continued)

(52) U.S. Cl.
CPC .............. *B60L 53/14* (2019.02); *B60L 53/305* (2019.02); *B60L 53/63* (2019.02); *B60L 53/68* (2019.02);
(Continued)

(58) Field of Classification Search
CPC ........ B60L 53/14; B60L 53/305; B60L 53/63; B60L 53/68; H02J 7/0045; H02J 7/007;
(Continued)

(56) References Cited

U.S. PATENT DOCUMENTS 5,594,318 A * 1/1997 Nor .......................... H02J 50/80
320/108
6,963,186 B2 11/2005 Hobbs
(Continued)

FOREIGN PATENT DOCUMENTS

CN 203084530 U 7/2013
CN 104011196 8/2014
(Continued)

OTHER PUBLICATIONS

Ching-Yen Chung; et al. "Design of Fair Charing Algorithm for Smart Electrical Vehicle Charging Infrastructure." Article 978-1-4799-0698-7/13/$31.00 2013 IEEE pp. 527-532.

*Primary Examiner* — Richard Isla
*Assistant Examiner* — Johali A Torres Ruiz

(57) ABSTRACT

An electric vehicle (EV) charging system includes a number of output connections (e.g., cables). Each of the output connections is connected to at least one head, and each head can be connected concurrently to an EV. A controller can direct a charging current, delivered over a dedicated circuit from an electric power supply, to a first one of the output connections if a first EV is connected to a head connected to the first one of the output connections. Then, the charging current to the first one of the output connections can be stopped, switched to a second one of the output connections, and restarted if a second EV is connected to a head connected to the second one of the output connections.

15 Claims, 15 Drawing Sheets

Related U.S. Application Data

(60) Provisional application No. 62/263,564, filed on Dec. 4, 2015.

(51) Int. Cl.
  *B60L 53/63* (2019.01)
  *B60L 53/68* (2019.01)
  *H02J 7/00* (2006.01)

(52) U.S. Cl.
  CPC ............ *H02J 7/0045* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 10/126* (2013.01)

(58) Field of Classification Search
  CPC ..... Y02E 60/00; Y02T 10/70; Y02T 10/7072; Y02T 90/12; Y02T 90/14; Y02T 90/16; Y02T 90/167; Y04S 10/126; Y04S 30/12
  See application file for complete search history.

(56) References Cited

U.S. PATENT DOCUMENTS

| | | |
|---|---|---|
| 9,346,365 B1 | 5/2016 | Penilla et al. |
| 10,850,627 B2 | 12/2020 | Reynolds et al. |
| 2001/0010456 A1 | 8/2001 | Kaite et al. |
| 2004/0169489 A1* | 9/2004 | Hobbs ................ B60L 53/31 320/104 |
| 2011/0021186 A1 | 1/2011 | Fischer |
| 2011/0031929 A1 | 2/2011 | Asada et al. |
| 2011/0032110 A1 | 2/2011 | Taguchi |
| 2011/0130916 A1 | 6/2011 | Mayer |
| 2011/0144823 A1 | 6/2011 | Muller et al. |
| 2011/0204847 A1 | 8/2011 | Turner |
| 2011/0213656 A1 | 9/2011 | Turner |
| 2011/0239116 A1 | 9/2011 | Turner et al. |
| 2011/0246252 A1 | 10/2011 | Uesugi |
| 2011/0260691 A1 | 10/2011 | Ishibashi et al. |
| 2012/0013298 A1 | 1/2012 | Prosser et al. |
| 2012/0109519 A1 | 5/2012 | Uyeki |
| 2012/0235646 A1* | 9/2012 | Lo ................ H02J 7/0027 320/137 |
| 2012/0265459 A1 | 10/2012 | Sfaelos |
| 2012/0278479 A1 | 11/2012 | Miller et al. |
| 2012/0309455 A1 | 12/2012 | Klose et al. |
| 2012/0330494 A1* | 12/2012 | Hendrix ................ B60L 58/10 701/29.3 |
| 2013/0002197 A1 | 1/2013 | Hernandez et al. |
| 2013/0024306 A1 | 1/2013 | Shah et al. |
| 2013/0035802 A1 | 2/2013 | Khaitan et al. |
| 2013/0179061 A1 | 7/2013 | Gadh et al. |
| 2013/0207455 A1* | 8/2013 | Doljack ................ H02J 7/0036 307/130 |
| 2013/0261953 A1 | 10/2013 | Kiyama et al. |
| 2013/0314037 A1* | 11/2013 | Caffy ...................... B60L 53/14 320/109 |
| 2013/0334879 A1* | 12/2013 | Ido ........................ B60R 16/033 307/10.1 |
| 2013/0346902 A1 | 12/2013 | Epstein et al. |
| 2014/0035526 A1 | 2/2014 | Tripathi et al. |
| 2014/0058575 A1* | 2/2014 | Ashworth ............... B60L 53/63 700/297 |
| 2014/0062240 A1 | 3/2014 | Batzner et al. |
| 2014/0062401 A1 | 3/2014 | Gadh et al. |
| 2014/0062402 A1* | 3/2014 | Farkas .................... B60L 53/14 320/109 |
| 2014/0163877 A1 | 6/2014 | Kiyama et al. |
| 2014/0179164 A1 | 6/2014 | Kanamori et al. |
| 2014/0179614 A1 | 6/2014 | Berezin et al. |
| 2015/0149221 A1 | 5/2015 | Tremblay |
| 2015/0295433 A1 | 10/2015 | Honda et al. |
| 2016/0088064 A1 | 3/2016 | Chen et al. |
| 2016/0193932 A1 | 7/2016 | Vaghefinazari |
| 2017/0158067 A1 | 6/2017 | Reynolds et al. |
| 2017/0158071 A1 | 6/2017 | Reynolds et al. |
| 2017/0158075 A1 | 6/2017 | Reynolds et al. |
| 2018/0065496 A1 | 3/2018 | Reynolds et al. |

FOREIGN PATENT DOCUMENTS

| | | |
|---|---|---|
| CN | 104321947 | 1/2015 |
| CN | 104919673 | 9/2015 |
| EP | 0820653 A1 | 1/1998 |
| JP | H05336673 | 12/1993 |
| JP | 2004364388 | 12/2004 |
| JP | 2010110173 | 5/2010 |
| JP | 2012110170 | 6/2012 |
| JP | 2012147555 | 8/2012 |
| JP | 2012147555 A | 8/2012 |
| JP | 2012217224 | 11/2012 |
| JP | 2013042579 | 2/2013 |
| JP | 2013074776 | 4/2013 |
| JP | 2013207904 | 10/2013 |
| JP | 2014140289 | 7/2014 |
| WO | 2017096208 | 6/2017 |

* cited by examiner

ELECTRIC VEHICLE CHARGING SYSTEM

REFERENCE TO RELATED APPLICATIONS

This application is a continuation of U.S. application Ser. No. 15/222,813, titled "An Electric Vehicle Charging System," filed on Jul. 28, 2016, which claims priority to U.S. Provisional Application No. 62/263,564, titled "Multiple Vehicle Charging Stations Per Power Circuit and Time Multiplexing Charging Method," filed on Dec. 4, 2015, both of which are incorporated by reference in their entirety. This application is related to the U.S. application Ser. Nos. 15/222,841 and 15/222,856, titled "An Electric Vehicle Charging Method" and "An Electric Vehicle Charging System Interface," respectively, both of which are incorporated by reference in their entirety.

BACKGROUND

Electric vehicles (EVs) rely on batteries that periodically need to be charged. EV owners can readily charge their vehicles at home, where they have exclusive access to home charging stations or electrical outlets. But when away from home, EV owners rely on and have to share charging stations in public or private places such as workplaces, shopping centers, movie venues, restaurants, and hotels.

The demand for charging stations is increasing as the number of EVs continues to increase. Businesses are starting to add charging stations to their parking lots as a perk for their employees and customers. Also, some local governments are mandating that businesses add charging stations.

Thus, whether driven by consumer demand or government mandate, more charging stations are being installed outside the home. However, the cost of a charging station (hardware, including dedicated power lines, and installation) is relatively high and is usually borne by the business owner. Accordingly, a solution that reduces the cost of a charging station would be valuable, by lessening the burden on businesses while increasing the availability of charging stations to EV owners.

Even if the cost of a charging station (including installation) is reduced, it will remain inefficient from a cost point-of-view to install enough charging stations to satisfy peak demand. Thus, charging stations will still need to be shared. EV owners by their nature understand the need to share charging stations, but nevertheless they are inconvenienced by the need to move their vehicle from a parking space to a charging station once the charging station becomes available, and then move their vehicle to another parking space after their vehicle is charged to make room for another vehicle. Accordingly, a solution that makes it easier for EV owners to share charging stations would also be valuable.

SUMMARY

In embodiments according to the present disclosure, a single circuit (power supply circuit) is routed to multiple charging stations (or to a single station that has multiple charging connectors, which are referred to herein as output connections, connectors, or cables). At any one time, only one of the charging stations/connectors on that single circuit is being used to charge a vehicle. That vehicle is charged for a specified period of time (e.g., 30 minutes), charging of that vehicle is then stopped, and then the next charging station/connector on the single circuit is used to charge another vehicle for a specified period of time (e.g., 30 minutes, or some other length of time), and so on. For example, if there are four charging stations/connectors on a single circuit and a vehicle is connected to each charging station/connector, then vehicle 1 at station/connector 1 is charged for a specified time period (the other vehicles are not being charged while vehicle 1 is charged), then vehicle 2 at station/connector 2 is charged, and so on, then back to vehicle 1 at station/connector 1 in, for example, round-robin fashion. If a vehicle is not connected to a charging station/connector, or if the vehicle connected to a charging station/connector does not need to be charged, then that charging station/connector is automatically bypassed.

More specifically, in an embodiment, an EV charging system includes a controller that controls a charging current that can be provided to a number of output connections (e.g., cables). As mentioned above, the output connections may be connected to the same charging station or the output connection may be connected to different charging stations. Each of the output connections is connected to at least one head, and each head can be connected concurrently to an EV. The controller can direct a charging current, delivered over a dedicated circuit from an electric power supply or panel, to a first one of the output connections if a first EV is connected to a head connected to the first one of the output connections. Then, the charging current to the first one of the output connections can be stopped, switched to a second one of the output connections, and restarted if a second EV is connected to a head connected to the second one of the output connections.

In an embodiment, the controller includes a processor (e.g., a central processing unit (CPU)) and a number of channels controlled by the CPU. Each of the channels can be connected to at least one head through a respective output connection. The CPU can direct a charging current from the input power supply to only one of the channels at a time if multiple EVs are concurrently connected to the heads. In an embodiment, each channel includes a voltage sensor and/or a current sensor that can be used to determine whether an EV is connected to a head that is connected to the channel.

In an embodiment, the charging current is directed to the first one of the output connections for a first interval of time, stopped when the first interval expires, and then directed to the second one of the output connections and restarted for a second interval of time (if an EV is connected to the second output connection). The length of the first interval and the length of the second interval are individually programmable. In an embodiment, the first interval and the second interval are not more than 30 minutes each in length.

In another embodiment, the charging current is directed to the first one of the output connections until the charging current drops to a threshold, stopped when the threshold is reached, and then directed to the second one of the output connections and restarted.

In an embodiment, the charging current is directed to the output connections in round-robin fashion if multiple EVs are concurrently connected to the output connections.

In an embodiment, the output connections include an output connection that is designated as a priority connection, in which case the charging current is directed to the priority connection more frequently than to the other output connections.

In an embodiment, before the charging current is provided to an output connection, the controller automatically determines whether there is an electrical load (e.g., an EV) connected to the output connection. The charging current is not directed to the output connection if there is not an electrical load.

In an embodiment, before the charging current is provided to an output connection, the controller automatically determines whether an EV connected to the output connection requires charging. The charging current is not provided to the output connection if the EV does not require charging.

In an embodiment, before a charging current is provided to an output connection, the controller automatically determines whether the output connection is already drawing a current, which indicates the possibility of a fault condition.

Embodiments according to the present invention thus include, but are not limited to, the following features: multiple physical charging stations/connections per power circuit; rotating (e.g., round-robin) charging; and automatic charging of multiple vehicles without user intervention. By allowing multiple charging stations to share a common power circuit, the overall cost of installing a charging station decreases substantially.

More specifically, because only a single circuit is used for multiple charging stations/connections, costs are reduced. In other words, it is not necessary to pay for a dedicated circuit for each charging station, for example. New charging stations that share the same power circuit can be added at a reduced cost per station, and therefore more charging stations can be installed for the same cost. Existing infrastructure (e.g., an existing circuit) can be readily modified to accommodate multiple charging stations/connections instead of a single charging station with a single output connection.

With more charging stations, vehicle charging is more convenient. For instance, vehicles will not have to be moved as frequently. From an employee's perspective, the availability of a convenient (and free) charging station at the workplace is a perk. From an employer's perspective, the availability of a convenient charging station may encourage employees to stay at work longer in order to get a free charge before leaving, plus employees' productivity may increase because they do not have to move their cars as frequently.

These and other objects and advantages of the various embodiments according to the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
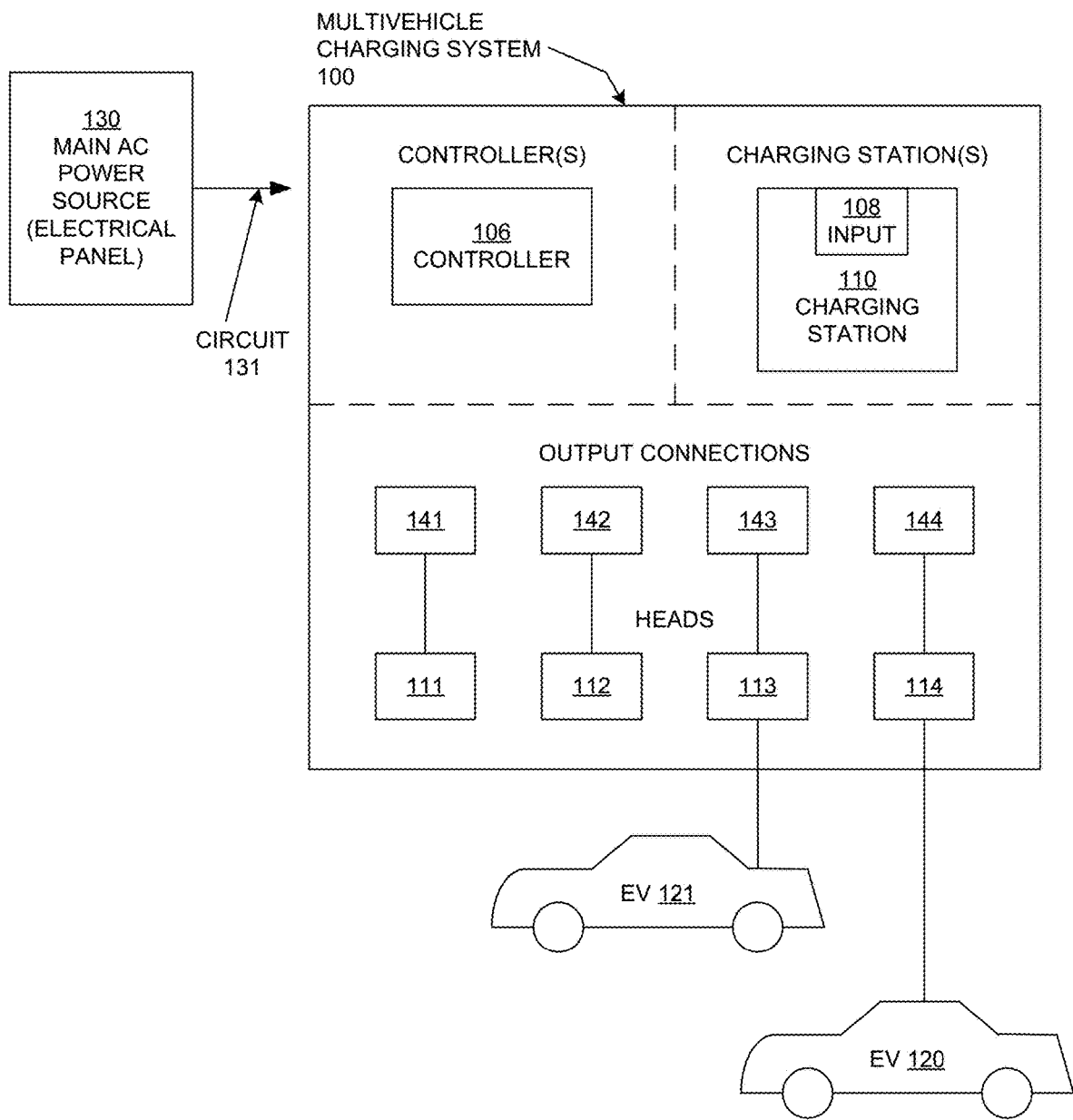
FIG. 1 is a block diagram showing elements of a multivehicle charging system in an embodiment according to the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "directing," "sending," "stopping," "determining," "generating," "displaying," "indicating," or the like, refer to actions and processes (e.g., flowcharts 1100, 1200, 1300, and 1800 of FIGS. 11, 12, 13, and 18, respectively) of an apparatus or computer system or similar electronic computing device or processor (e.g., the device 1900 of FIG. 19). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD or NVMD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

In overview, in embodiments according to the present disclosure, a single circuit (power circuit) is routed to multiple charging stations (or to a single station that has multiple charging connectors, which are referred to herein as output connections, connectors, or cables). At any one time, only one of the charging stations/connectors on that single circuit is being used to charge a vehicle. That vehicle is charged for a specified period of time (e.g., 30 minutes), charging of that vehicle is then stopped, and then the next charging station/connector on the single circuit is used to charge another vehicle for a specified period of time (e.g., 30 minutes, or some other length of time), and so on according to a charging sequence or procedure. For example, if there are four charging stations/connectors on a single circuit and a vehicle is connected to each charging station/connector, then vehicle 1 at station/connector 1 is charged for a specified time period (the other vehicles are not being charged while vehicle 1 is charged), then vehicle 2 at station/connector 2 is charged, and so on, then back to vehicle 1 at station/connector 1 in, for example, round-robin fashion (a round-robin charging sequence). If a vehicle is not connected to a charging station/connector, or if the vehicle connected to a charging station/connector does not need to be charged, then that charging station/connector is bypassed in accordance with the charging procedure.

FIG. 1 is a block diagram showing selected elements of a multivehicle charging system 100 in an embodiment according to the invention. The multivehicle charging system 100 can include a number of different charging stations such as the charging station 110. Each charging station includes an input 108 that receives a voltage. The voltage comes from an electrical panel (main alternating current [AC] power source 130) and is delivered over a dedicated circuit 131 to a charging station or a group of charging stations, depending on the implementation; see FIGS. 4-8 for information about different implementations. There may be multiple electrical panels and multiple circuits, depending on the number of charging stations. Each charging station includes power electronics (not shown) such as wires, capacitors, transformers, and other electronic components.

In the example of FIG. 1, the multivehicle charging system 100 also includes a number of output cables or output connections 141, 142, 143, and 144 (141-144). As will be described, depending on the implementation, a charging station can have only a single output connection, or a charging station can have multiple output connections. Thus, depending on the implementation, the output connections 141-144 can all be coupled to a single charging station, or each of the output connections can be coupled to a respective charging station (one output connection per charging station); see FIGS. 4-8 for additional information. While four output connections are illustrated and described in the example of FIG. 1, embodiments according to the invention are not so limited; there can be fewer than four output connections per charging station, or more than four output connections per charging station.

As will be described in conjunction with FIGS. 4-8 below, a controller 106 (which may also be referred as the electric vehicle master controller) manages distribution of electricity in the multivehicle charging system 100. The controller 106 may perform other functions, such as metering of power usage and storage of information related to charging events. Depending on the implementation, the multivehicle charging system 100 can include multiple controllers. Depending on the implementation, a controller may manage EV charging at multiple charging stations, or a controller may manage EV charging at a single charging station. FIGS. 5-8, described below, illustrate different implementations of the controller 106.

Continuing with reference to the example of FIG. 1, each of the output cables or connections 141-144 is coupled to at least one head (the heads 111, 112, 113, and 114, respectively). A head may be a plug that can be plugged into a socket on an electric vehicle (EV) such as the EVs 120 and 121. Alternatively, a head may be a socket that can be connected to a plug from an EV. In general, a head is configured to connect to an EV and deliver a charging current to an EV to which it is connected. In the example of FIG. 1, a single head is connected to each output cable. In an embodiment, multiple heads are connected to one or more of the output connections 141-144 (see the discussion below of FIGS. 7 and 8).

An EV can be any type of vehicle such as, but not limited to, a car, truck, motorcycle, golf cart, or motorized (power-assisted) bicycle.

Embodiments according to the invention can be utilized in Level 2 or Level 3 charging stations, although the invention is not limited to such types of charging stations and can be utilized in other types that may come into existence in the future. In an embodiment, the maximum charging current is 32 amps, but again embodiments according to the invention are not so limited.

In embodiments according to the invention, using the example of FIG. 1, the multivehicle charging system 100 provides a charging current to only one of the output connections 141-144 at a time if multiple EVs (e.g., EVs 120 and 121) are concurrently connected to the charging station via the heads. That is, for example, if the period of time in which the EV 120 is connected to the output connection 144 overlaps the period of time in which the EV 121 is connected to the output connection 143, then a charging current is supplied to only one of those two EVs at a time.

In an embodiment, a charging current is not provided to an output connection if there is not an electrical load (e.g., an EV) connected to that output connection. In an embodiment, a charging current is not provided to an output connection if the EV connected to that output connection does not require further charging.

In an embodiment, in the example of FIG. 1, a charging current is provided to a first one of the output connections 141-144 for an interval of time and then the charging current is stopped, switched to another one of the output connections, restarted for another interval of time (whose length may be the same as or different from the length of the preceding interval of time), and so on, until a charging current has been provided to all of the output connections that are connected to an EV, at which point the cycle begins again.

In an embodiment, each interval is 30 minutes in length, but the invention is not so limited. The length of each interval is programmable and is changeable. The length of an interval for an output connection can be different from that of another output connection; in other words, the lengths of the intervals do not have to be the same across all of the output connections 141-144.

In another embodiment, a charging current is provided to one of the output connections 141-144 until the charging current drops below a threshold amount (e.g., 50 percent of peak), the charging current to that output connection is stopped, switched to another one of the output connections, restarted until the charging current again drops below a threshold amount, and so on (additional detail is provided below in the example of FIG. 10).

With reference still to the example of FIG. 1, in an embodiment, a charging current is provided to each of the output connections connected to an EV in round-robin fashion, one output connection at a time. For example, if EVs are connected to all of the output connections 141-144, then a charging current is provided to the output connection 141, then to output connection 142, then to output connection 143, then to output connection 144, then back to output connection 141, and so on (additional detail is provided below in the example of FIG. 9).

As noted above, if an output connection is not connected to an EV or if the EV does not require further charging, then the output connection is automatically skipped. However, the invention is not so limited. For example, an output connection can be designated as a priority connection, in which case a charging current is provided to the priority connection more frequently or for a longer period of time than to other output connections. More specifically, if there are four output connections (1, 2, 3, and 4) that are used in round-robin fashion, then the charging sequence would be 1-2-3-4-1-2-3-4, etc. (assuming an EV is connected to each of the output connections). If output connection 2 is designated as a priority connection, then the charging sequence might be 1-2-3-2-4-2-1-2-3-2-4-2, etc., or 2-1-2-3-4-2-1-2-3-4-2, etc. (again, assuming an EV is connected to each of the output connections). The charging procedure or sequence is programmable and is changeable. In terms of charging time, if output connection 2 is designated as a priority connection, then the charging times might be (in minutes) 30-60-30-30-30-60-30-30, etc. (assuming a round-robin procedure and an EV is connected to each of the output connections).

As mentioned above, in an embodiment, if there is not an EV connected to the output connection, then a charging current is not supplied to the output connection; in other words, that output connection is skipped. In such an embodiment, before a charging current is provided to an output connection, the charging system is configured to detect whether an EV is connected to that output connection (additional detail is provided below in the example of FIG. 4). Thus, in the example of FIG. 1, a check is made to determine whether an EV is connected to the output connection 143, a charging current is then provided to the output connection 143 since the EV 121 is connected to that output connection, the charging current to the output connection 143 is stopped, a check is made to determine whether an EV is connected to the output connection 144, a charging current is then provided to the output connection 144 since the EV 120 is connected to that output connection, the charging current to the output connection 144 is stopped, a check is made to determine whether an EV is connected to the output connection 141, a charging current is not provided to the output connection 141 since an EV is not connected to that output connection, a check is made to determine whether an EV is connected to the output connection 142, and so on.

Also as mentioned above, in an embodiment, a charging current is not provided to an output connection if the EV connected to that output connection does not require further charging. In such an embodiment, before a charging current is provided to an output connection, the charging system is configured to automatically determine whether or not an EV connected to an output connection requires a charge. For example, an EV's charge signature or state of charge (SOC) can be provided by the EV or accessed by the charging system to determine whether the EV's batteries are fully charged or at least charged to a threshold amount (see the discussion of FIG. 4 below). If the batteries are fully or satisfactorily charged, then a charging current is not supplied to the output connection; in other words, that output connection is skipped. Thus, in this embodiment and with reference to the example of FIG. 1, a check is made to determine whether an EV is connected to the output connection 143 and whether the EV needs to be charged. Because the EV 121 is connected to the output connection 143, a charging current may then be provided to the output connection 143 if that EV requires a charge. The charging current to the output connection 143 is stopped, and a check is then made to determine whether another EV is connected to the output connection 144 and whether that EV needs to be charged. Because the EV 120 is connected to the output connection 144, a charging current may then be provided to the output connection 144 if that EV requires a charge. This process continues to the next output connection until all output connections have been checked, and then returns to the first output connection to begin another cycle.

Figure 2:
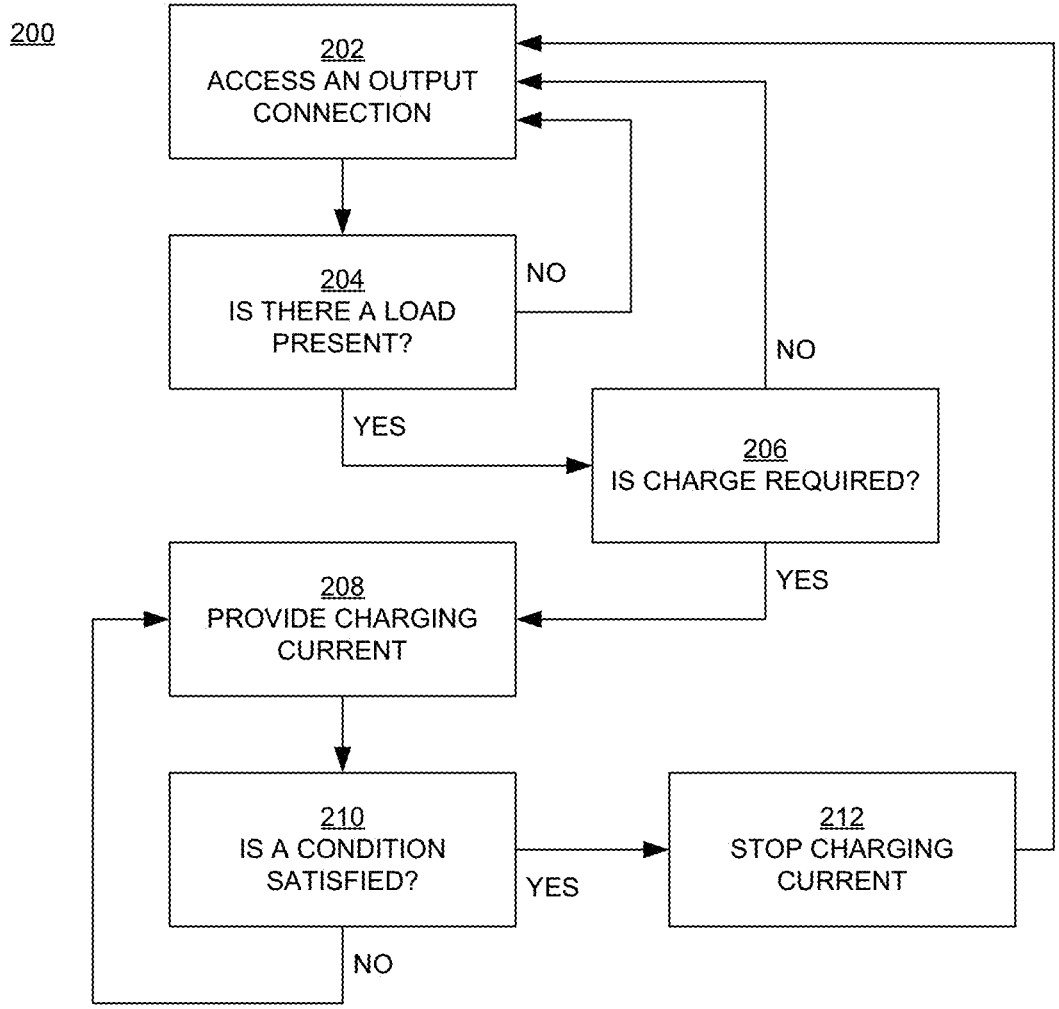
FIG. 2 is a flowchart illustrating a method of charging one or more electric vehicles (EVs) in an embodiment according to the invention.

The flowchart 200 of FIG. 2 illustrates a method of charging one or more EVs in an embodiment according to the invention. In block 202, an output connection is selected or accessed. In block 204, a determination is made whether there is a load (an EV) present on the selected output connection. This determination can be made automatically. If not, then the flowchart 200 returns to block 202 and another output connection is selected or accessed in accordance with a charging sequence or procedure. If there is a load present, then the flowchart 200 proceeds to block 206. In block 206, a check is made to determine whether the EV requires a charge. If so, then the flowchart 200 proceeds to block 208; otherwise, the flowchart returns to block 202 and another output connection is selected or accessed. In block 208, a charging current is provided to the selected output connection. In block 210, a determination is made whether a condition is satisfied. The condition may be, for example, an interval of time has expired or the charging current to the selected output connection has decreased to a threshold value. If the condition is satisfied, then the charging current to the selected output connection is stopped in block 212, and then the flowchart 200 returns to block 202 and another output connection is selected or accessed according to the charging sequence or procedure. If the condition is not satisfied, then the flowchart 200 returns to block 208 and the charging current to the selected output connection is continued.

Figure 3:
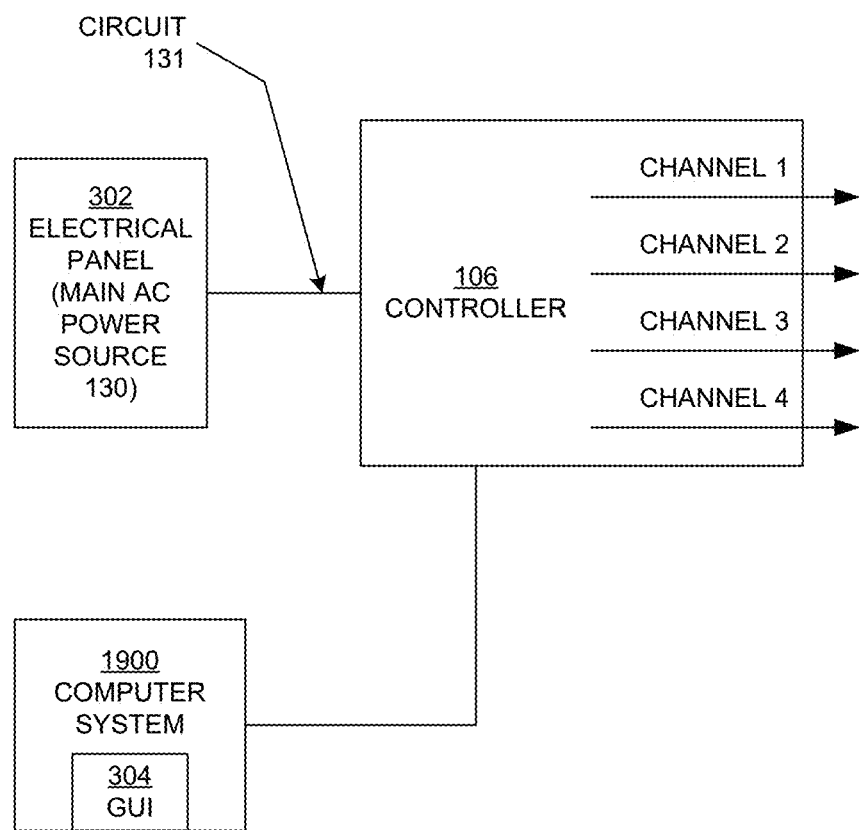
FIG. 3 is a block diagram illustrating elements of a multivehicle charging system in an embodiment according to the invention.

FIG. 3 is a block diagram illustrating elements of a multivehicle charging system in an embodiment according to the invention. Only a single power circuit is illustrated; however, the present invention is not so limited. In other words, multiple such systems can be implemented in parallel.

In the example of FIG. 3, main power is delivered over a dedicated circuit 131 from an electrical panel 302 (e.g., from the main AC power source 130) to a controller 106, which also may be referred to as a cyber switching block. The controller 106 is in communication with a graphical user interface (GUI) 304 implemented on a computer system 1900 (the GUI is described further in conjunction with FIGS. 14-18). Communication between the controller 106 and the computer system 1900 may be implemented using a wired and/or wireless connection and may occur directly and/or over the Internet or an intranet (e.g., an Ethernet or local area network). In an embodiment, the controller 106 is in the charging station 110. In another embodiment, the controller 106 is not in the charging station 110, but is in communication with the charging station.

In the example of FIG. 3, the controller 106 has four channels: channels 1, 2, 3, and 4 (1-4). Depending on the implementation, each channel can be connected to a respective charging station, or each channel can be connected to a respective output connection. This is described further in conjunction with FIGS. 5 and 6.

Figure 4:
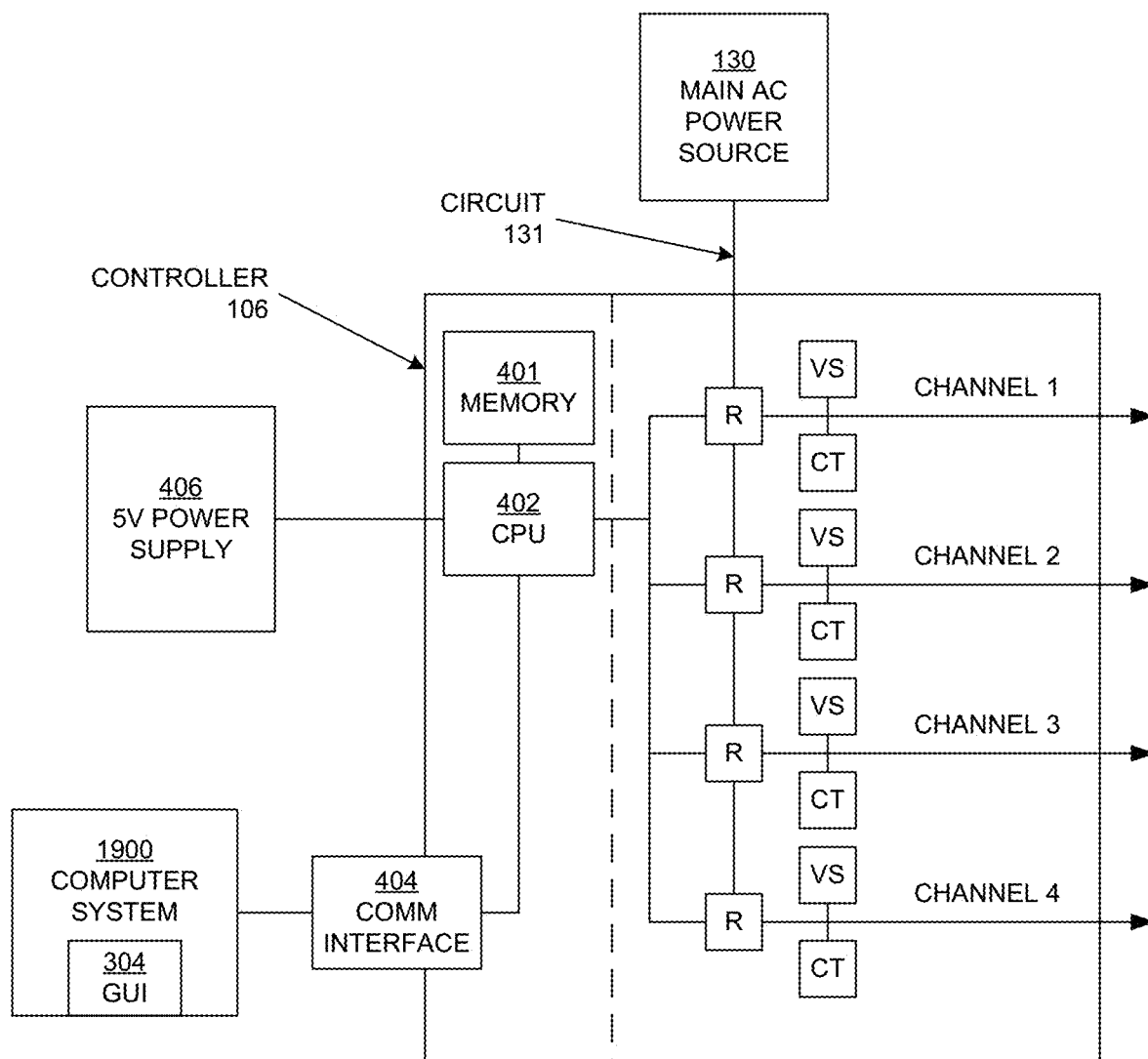
FIG. 4 is a block diagram illustrating elements of a controller for a multivehicle charging station in an embodiment according to the invention.

FIG. 4 is a block diagram illustrating elements of the controller 106 in an embodiment according to the invention. In the example of FIG. 4, the controller 106 includes a processor (e.g., a central processing unit (CPU)) 402 that can be coupled to the computer system 1900 and the GUI 304 via a communication interface 404, which as mentioned above is capable of wireless and/or wired communication. The controller 106 can be implemented on a single printed circuit board (PCB) that has a low voltage side (e.g., containing the CPU) and a separate high voltage side (the main power side). In an embodiment, the processor 402 is powered by a separate, low voltage (e.g., five volt) power supply 406. In an embodiment, the controller 106 includes memory 401, which can be used to store information related to charging events, for example.

The main AC power source 130 is connected to each of the channels 1-4 by a respective relay R or switch that is individually controlled by the processor 402. As described herein, by turning on and off the relay or switch, a charging current is provided to a first one of the channels, the charging current to the first one of the channels is then turned off, a charging current is then provided to a second one of the channels, and so on. More specifically, for example, a charging current can be provided to a first one of the channels, turned off when an interval of time expires or when a charging threshold is reached, then provided to a second one of the channels, and so on. Also, in various embodiments, a charging current is provided to each of the channels one channel at a time in round-robin fashion, and/or a channel is designated as a priority channel, in which case a charging current is provided to the priority channel more frequently than to other channels. Many different charging sequences or procedures can be used.

In an embodiment, each of the channels 1-4 includes a respective current sensor CT and a respective voltage sensor VS. Accordingly, the controller 106 can detect whether an electrical load (e.g., an EV) is connected to a channel before a charging current is provided to the channel. In an embodiment, the controller 106 can also detect a charge signature for an EV connected to a channel before a charging current is provided to the channel; if the charge signature indicates that the EV does not require further charging (e.g., it is fully charged), then the charging current is not provided to the channel.

In an embodiment, the controller 106 can also automatically determine whether a channel is already drawing a current before a charging current is provided to the channel. If so, the controller indicates a fault condition (actually, the possibility of a fault condition is indicated). For example, an alert can be displayed on the GUI 304. Diagnostics can then be performed to determine whether an actual fault condition is present, and corrective actions can be performed if so.

In an embodiment, the controller 106 can also automatically determine whether a channel is drawing a current greater than the amount it is supposed to be drawing and, if so, the controller indicates a fault condition. For example, if the maximum current that should be drawn is 32 amps and if an amperage greater than that is detected, then a fault condition is indicated. For example, an alert can be displayed on the GUI 304. Diagnostics can then be performed to determine whether an actual fault condition is present, and corrective actions can be performed if so.

In an embodiment, at the end of each cycle through all of the channels 1-4, a check is made to ensure no channel is drawing a current. If a channel is drawing a current, then all relays are opened, and then a check is completed again to ensure all channels are off and not drawing current. Once it is confirmed that all channels are clear, the multivehicle charging process can then begin again.

In an embodiment, a channel is automatically shut down when any power-related fault or issue is detected. In an embodiment, if a channel has been shut down (either automatically or manually), the load check is bypassed on the channel until it is manually turned on again.

Figure 5:
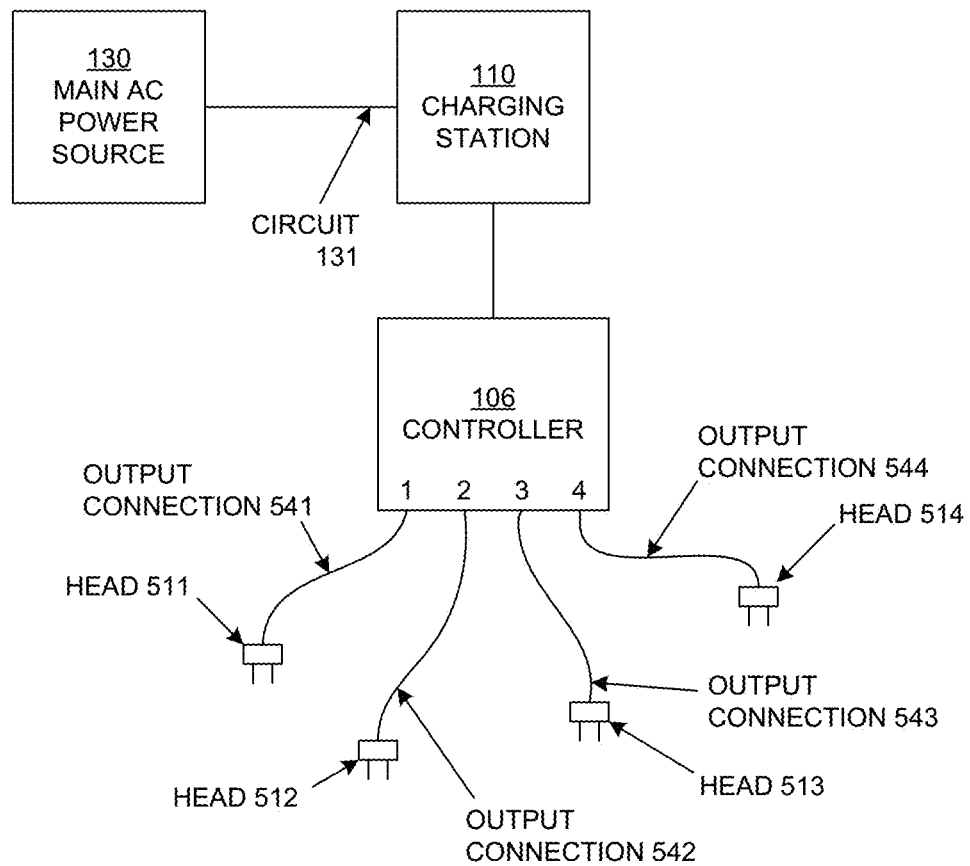
FIG. 5 is a block diagram illustrating an example of an implementation of a multivehicle charging system in an embodiment according to the invention.

FIG. 5 is a block diagram illustrating an example of an implementation of a multivehicle charging system in an embodiment according to the invention. In the example of FIG. 5, the charging station 110 is connected to an electrical panel (the main AC power source 130) via a single (dedicated) circuit 131, and is also connected to the controller 106. In an embodiment, the controller 106 is incorporated into the charging station 110. Each of the channels 1-4 of the controller 106 is connected to a respective one of the output connections 541, 542, 543, and 544 (541-544), which in turn are connected to heads 511, 512, 513, and 514 (511-514), respectively. In this implementation, the controller 106 directs a charging current to the output connections 541-544, one at a time as described above, and thus also directs a charging current to the heads 511-514, one at a time.

The implementation of FIG. 5 can be replicated, so that the multivehicle charging system constitutes a part of a network of multiple charging stations, each charging station capable of charging multiple EVs and each charging station having its own dedicated circuit from the electrical panel.

Figure 6:
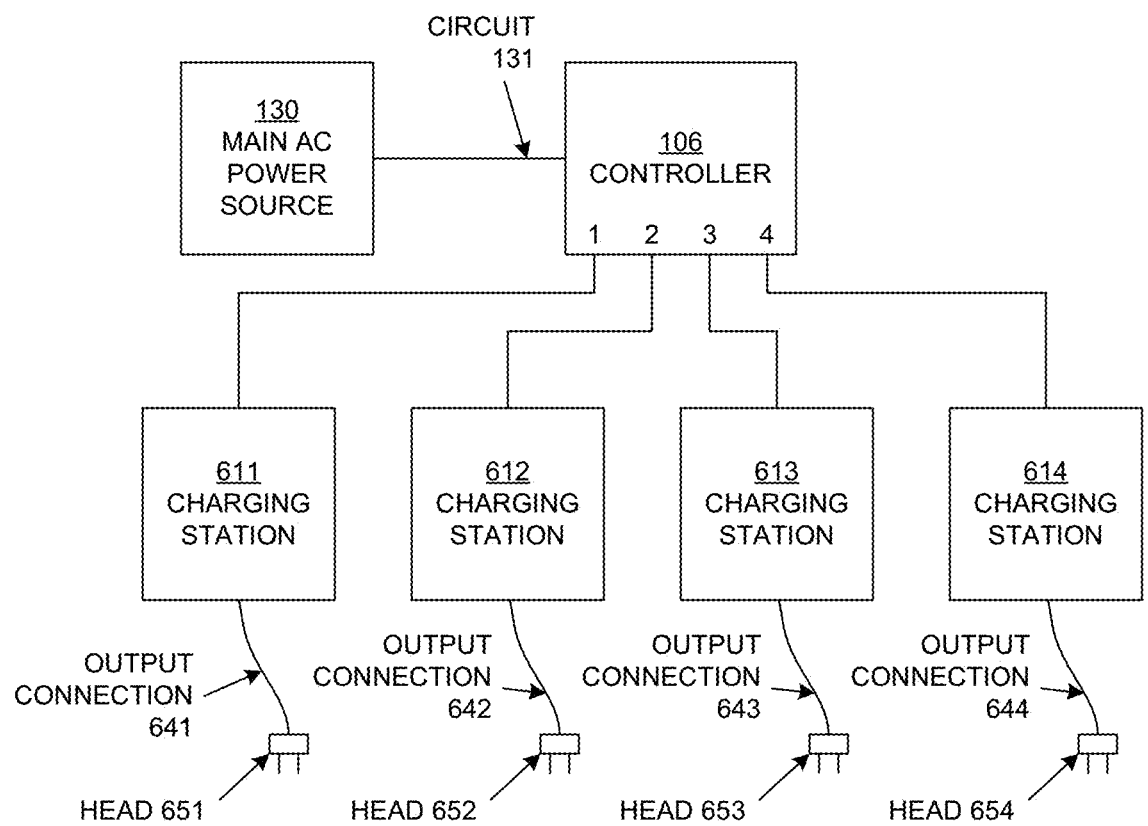
FIG. 6 is a block diagram illustrating an example of an implementation of a multivehicle charging system in an embodiment according to the invention.

FIG. 6 is a block diagram illustrating an example of another implementation of a multivehicle charging system in an embodiment according to the invention. In the example of FIG. 6, the controller 106 is connected to an electrical panel (the main AC power source 130) via a single (dedicated) circuit 131. Each of the channels 1-4 of the controller 106 is connected to a respective charging station 611, 612, 613, and 614 (611-614), which in turn are connected to heads 651, 652, 653, and 654 (651-654), respectively, by a respective output connection 641, 642, 643, or 644 (641-644). In the FIG. 6 implementation, the controller 106 directs a charging current to the channels 1-4 one at a time, and hence to the charging stations 611-614 one at a time, and thus also directs a charging current to the output connections 641-644 and the heads 651-654, one at a time.

The implementation of FIG. 6 can be replicated, so that the multivehicle charging system constitutes a part of a network of multiple charging stations, with multiple charging stations connected to a single controller and each controller having its own dedicated circuit from the electrical panel.

Figure 7:
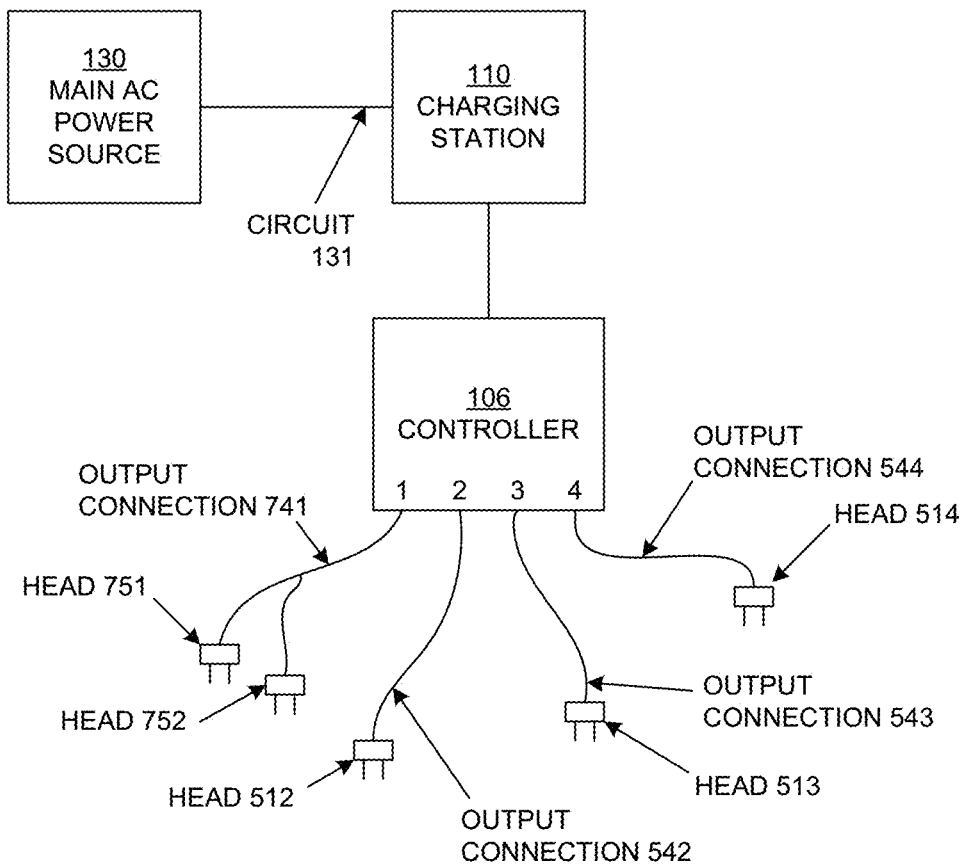
FIG. 7 is a block diagram illustrating an example of an implementation of a multivehicle charging system in an embodiment according to the invention.

FIG. 7 is a block diagram illustrating an example of an implementation of a multivehicle charging system in an embodiment according to the invention. The FIG. 7 embodiment is similar to the embodiment of FIG. 5, except that the charging station 110 has at least one output connection (e.g., the output connection 741) that has more than one (e.g., two) heads 751 and 752. In an embodiment, the controller 106 is incorporated into the charging station 110.

In the FIG. 7 embodiment, the controller 106 directs a charging current to the output connections 741, 542, 543, and 544, one at a time, as described herein. When the charging current is directed to the output connection 741, it is split between the heads 751 and 752. For example, one of the heads receives about half of the charging current, and the other head receives the rest of the charging current. If the maximum charging current is 32 amps, then the heads 751 and 752 each receive about 16 amps. In this manner, two EVs can be charged at the same time even though a charging current is provided to only one output connection at a time.

Figure 8:
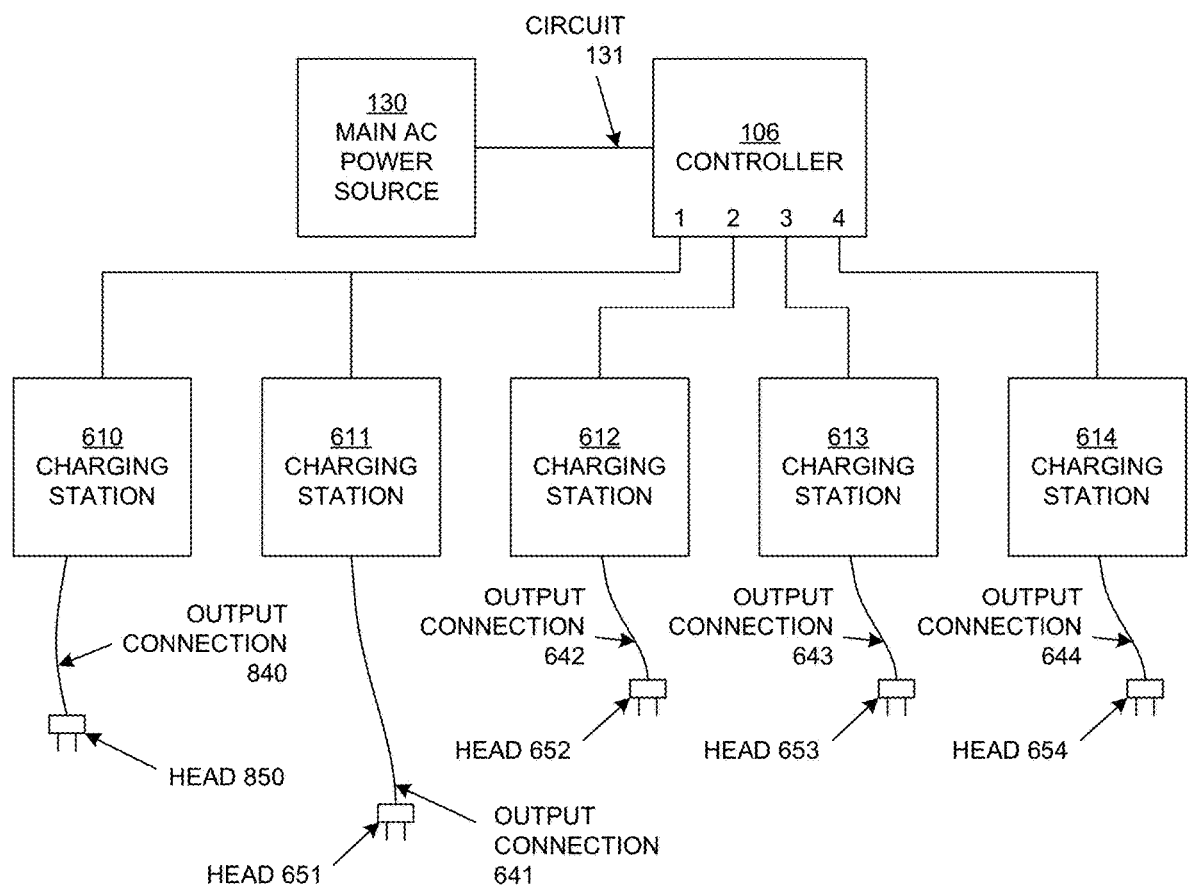
FIG. 8 is a block diagram illustrating an example of an implementation of a multivehicle charging system in an embodiment according to the invention.

FIG. 8 is a block diagram illustrating an example of another implementation of a multivehicle charging system in an embodiment according to the invention. The FIG. 8 embodiment is similar to the embodiment of FIG. 6, except that at least one of the channels in the controller 106 (e.g., channel 1) is connected to two charging stations 610 and 611. The charging station 610 is connected to an output connection 840, which is connected to the head 850, and the charging station 611 is connected to the output connection 641, which is connected to the head 642. In this embodiment, the controller 106 directs a charging current to the channels 1-4, one channel at a time. However, when the charging current is directed to channel 1, that charging current can be split between the charging stations 610 and 611, and thus ultimately the charging current to channel 1 can be split between the output connections 840 and 641 and hence between the heads 850 and 651. Therefore, for example, when EVs are connected to the heads 850 and 651, one of the heads receives about half of the charging current on channel 1, and the other head receives the rest of that charging current. In this manner, two EVs can be charged at the same time even though a charging current is provided to only channel at a time.

Any combination of the implementations of FIGS. 5, 6, 7, and 8 can be deployed within the same multivehicle charging network.

Figure 9:
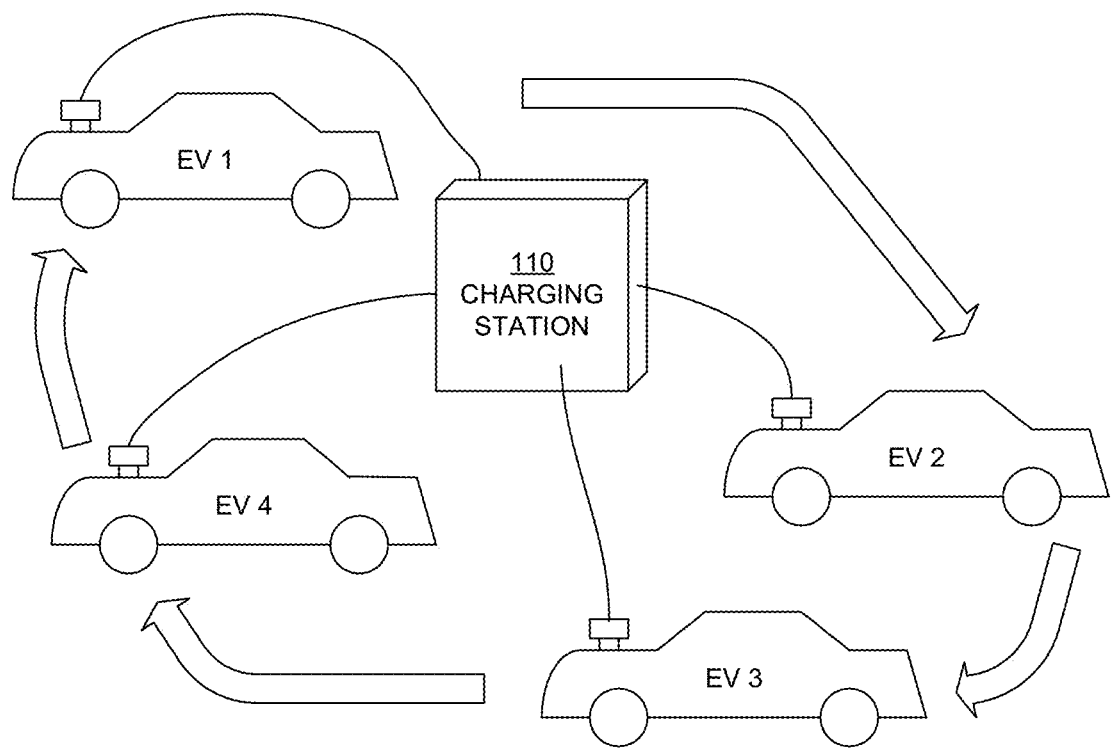
FIG. 9 illustrates an example of multiple vehicles charging at a charging station with multiple output connections in an embodiment according to the present disclosure.

FIG. 9 illustrates an example of multiple vehicles charging at a charging station with multiple output connections in an embodiment according to the present disclosure. Four output connections and vehicles are illustrated; however, the invention is not so limited.

In the example of FIG. 9, rotational charging is performed at 30-minute intervals; however, the present invention is not limited to the use of 30-minute intervals, and is also not limited to each vehicle being charged for the same length of time.

In the example of FIG. 9, vehicle 1 is charged for up to 30 minutes (if it is fully charged in less than 30 minutes, then charging can be stopped early). Charging is stopped after 30 minutes and the output connector to vehicle 1 is turned off, and the next output connector is checked to determine if it is connected to a load (e.g., another vehicle). In this example, a load is detected (vehicle 2), and so the output connector for vehicle 2 is turned on and vehicle 2 is charged for up to 30 minutes, then charging is stopped and the connector to vehicle 2 is turned off. The next output connector is checked to determine if it is connected to a load. In this example, a load is detected (vehicle 3), but the charge signature indicates that vehicle 3 is fully charged and so the connector to vehicle 3 is turned off and vehicle 3 is skipped. The next output connector is checked to determine if it is connected to a load. In this example, a load is detected (vehicle 4), and so the output connector for vehicle 4 is turned on and vehicle 4 is charged for up to 30 minutes, then charging is stopped and the connector to vehicle 4 is turned off. This charging cycle then returns to the output connector for vehicle 1, and the cycle continues as just described until each vehicle is fully charged. At any point, a vehicle can be disconnected and replaced with another vehicle. If a vehicle is not connected to an output connector, then that position in the cycle is skipped.

Figure 10:
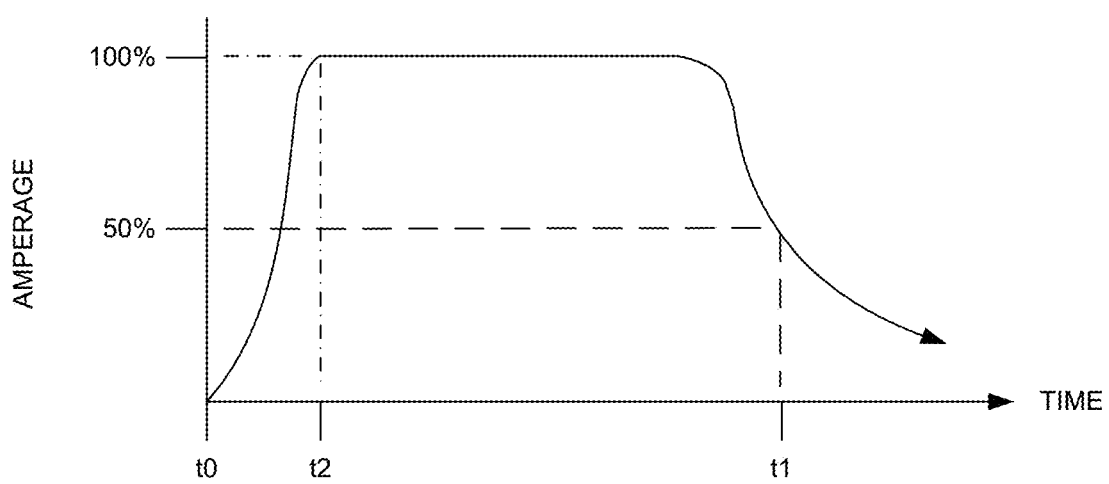
FIG. 10 is a graph illustrating an example of a charge signature for an EV used for managing charging in an embodiment according to the invention.

FIG. 10 is a graph illustrating an example of a charge signature for an EV (the amount of charging current versus time being delivered to the EV) used for managing charging in an embodiment according to the invention. At time t0, the charging current is turned on and ramps up to its maximum value (100 percent). The maximum value may be 16 amps or 32 amps, for example, depending on the type of EV (e.g. Level 2 or Level 3). That is, some EVs (Level 2) are configured for a charging current of 16 amps while other EVs (Level 3) are configured for a charging current of 32 amps. In general, the charging station 110 or the controller 106 (FIG. 4) can determine what type of EV is connected to the charging system and can then deliver the correct amperage.

Continuing with the example of FIG. 10, after some period of time at 100 percent, the EV is nearly fully charged and the charging current begins to decrease. At time t1, the decreasing charging current has reached a threshold value (e.g., 50 percent).

In an embodiment, the charging current at each head (or output connection or channel) is monitored. In such an embodiment, when the charging current decreases to a preset threshold value (e.g., 50 percent, as in the example of FIG. 10), then the charging current is stopped and the charging current is switched to another head (or output connection or channel). Relative to the example of FIG. 9, instead of turning off the charging current to an output connection when a time interval expires or when the EV is fully charged, the charging current is turned off when it decreases to a threshold value.

The charge signature can also be used to automatically determine whether or not an EV is fully charged. For example, if the charging current to a head (or output connection or channel) is turned on at time t0 but does not stabilize after a preset amount of time has passed (t2), then the charging current is turned off and switched to another head (or output connection or channel).

Figure 11:
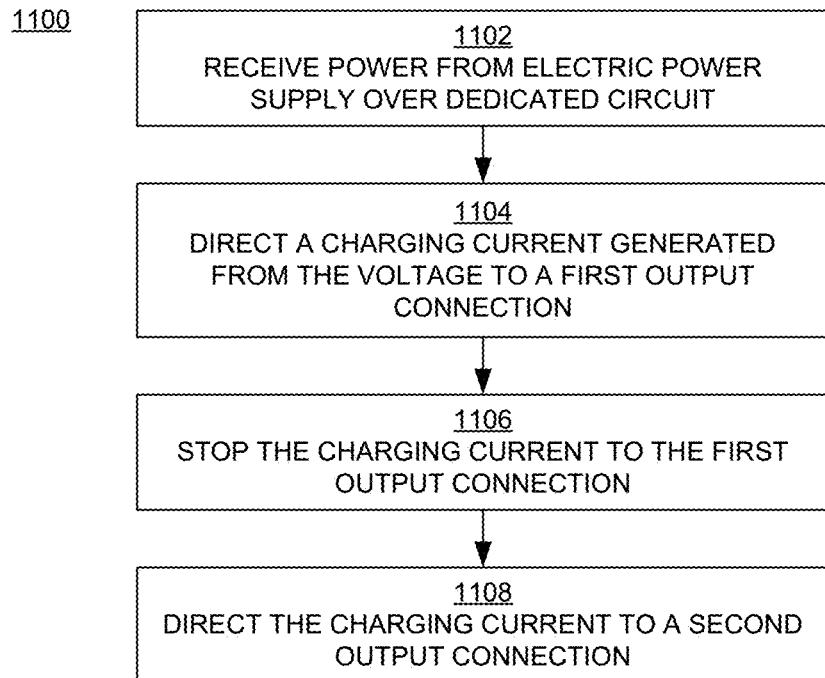
FIG. 11 is a flowchart illustrating examples of computer-implemented operations for monitoring and managing a network of EV charging stations in embodiments according to the present invention.
Figure 12:
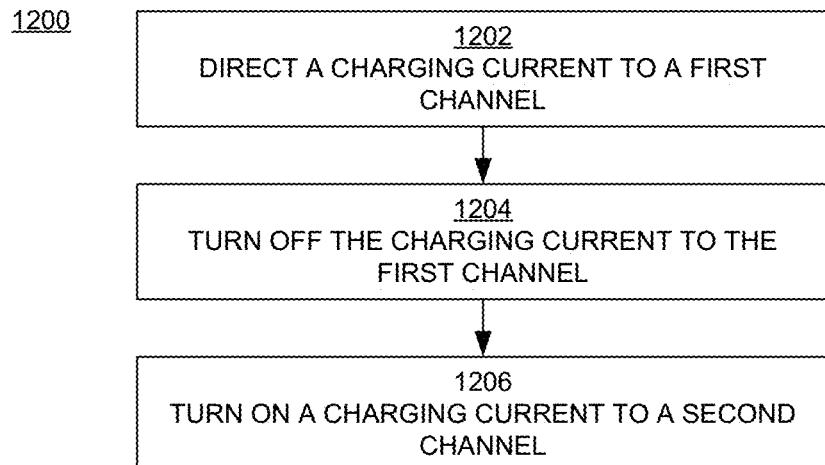
FIG. 12 is a flowchart illustrating examples of computer-implemented operations for monitoring and managing a network of EV charging stations in embodiments according to the present invention.
Figure 13:
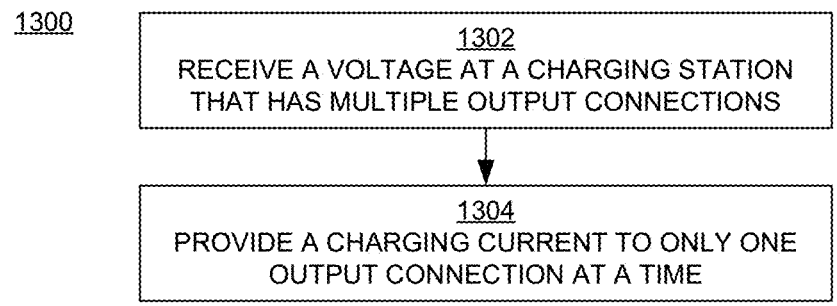
FIG. 13 is a flowchart illustrating examples of computer-implemented operations for monitoring and managing a network of EV charging stations in embodiments according to the present invention.

FIGS. 11, 12, and 13 are flowcharts 1100, 1200, and 1300, respectively, illustrating examples of operations for monitoring and managing a network of EV charging stations in embodiments according to the present invention. These operations are generally described below, as details of these operations have already been described above.

The flowchart 1100 of FIG. 11 can be implemented in a multivehicle charging system such as those illustrated in FIGS. 5, 6, 7, and 8. In block 1102, with reference also to FIGS. 5-8, a voltage is received at a controller (106) over a dedicated circuit (131) from an electric power supply (130).

In block 1104, a charging current generated using the voltage is directed to a first output connection (e.g., 541) if a first EV is connected to a head (e.g., 511) of the first output connection.

In block 1106, the charging current to the first output connection is stopped.

In block 1108, after the charging current to the first output connection is stopped, the charging current is directed to a second output connection (e.g., 542) if a second EV is connected to a head (e.g., 512) of the second output connection. In an embodiment, the charging current is directed to the first output connection for a first interval of time, stopped when the first interval expires, and then directed to the second output connection for a second interval of time. In an embodiment, the charging current is directed to the first output connection until the charging current drops to a threshold amperage, stopped when the threshold is reached, and then directed to the second output connection.

In an embodiment, in blocks 1104 and 1108, before the charging current is provided to an output connection, a determination is made as to whether the charging current should be provided.

In an embodiment, in blocks 1104 and 1108, before the charging current is provided to an output connection, a determination is made as to whether there is an electrical load connected to the output connection. In this embodiment, the charging current is not directed to the output connection if there is not an electrical load.

In an embodiment, in blocks 1104 and 1108, before the charging current is provided to an output connection, a determination is made as to whether an EV connected to the output connection requires further charging (e.g., is fully charged). For example, a charge signature for the EV can be used to determine whether the EV is fully charged. In this embodiment, the charging current is not provided to the output connection if the EV does not require further charging.

In an embodiment, in blocks 1104 and 1108, before a charging current is provided to an output connection, a determination is made as to whether the output connection is already drawing a current, and for indicating a fault condition when the output connection is drawing a current before the charging current is provided.

The flowchart 1200 of FIG. 12 can be executed by a controller (106) that includes a processor 402 and a number of channels (1-4) as described in conjunction with FIG. 4. In block 1202, a charging current generated from an input power supply (130) is directed to a first one of the channels.

In block 1204, the charging current to the first channel is turned off. In various embodiments, the charging current is turned off if a time interval expires or if the amperage of the charging current decreases to a particular threshold.

In block 1206, after the charging current to the first channel is turned off, a charging current is directed from the input power supply to a second one of the channels.

With reference also to FIG. 1, the flowchart 1300 of FIG. 13 illustrates a method of charging one or more EVs at a charging station (110). In block 1302, a voltage from an electric power supply (130) is received at an input (108) of the charging station over a dedicated circuit (131). The charging station includes a number of output cables or connectors (141-144), each of which is connected to at least one head (111-114).

In block 1304, a charging current is provided to only one of the output cables at a time if multiple EVs are concurrently connected to the charging station via the heads. The charging current is provided to a first one of the output cables and then the charging current is stopped, switched to a second one of the output cables, and restarted.

FIGS. 14, 15, 16, and 17 illustrate examples of displays that constitute selected elements of the GUI 304 (FIG. 3) that are rendered on a display device 1912 in embodiments according to the invention. The displays shown in these examples may be full-screen displays, or they may be windows in a full-screen display. The displays may be displayed individually, or multiple displays may be displayed at the same time (e.g., side-by-side). The displays shown and described below are examples only, intended to demonstrate some of the functionality of the GUI 304. The present invention is not limited to these types or arrangements of displays.

The GUI 304 is a browser-based interface that utilizes current basic functions of the browser plus additional functionality that can be used to manage and monitor a multi-vehicle charging system or network that includes one or more charging stations such as those described previously herein. Each charging station, output connection, and/or head can be monitored and controlled (programmed) over a network.

Furthermore, some or all of the GUI 304 can be accessed remotely from another computer system or a device such as a smartphone, or information from the GUI can be pushed to remote devices such as other computer systems and smartphones. Also, in an embodiment, information from a smartphone or computer system, including a computer system or similar type of intelligent device on an EV, is received via the browser-based interface and used, for example, to control charging or to provide billing information to the owner or manager of the EV charging system.

Figure 14:
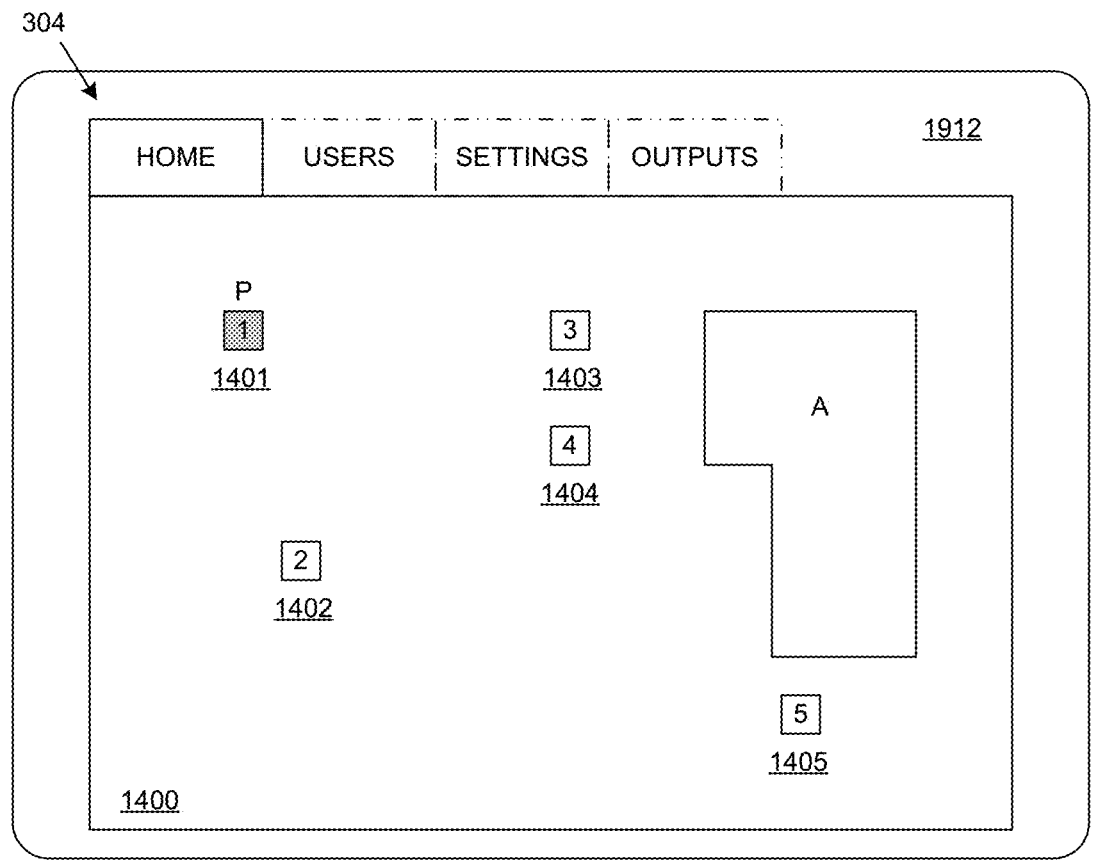
FIG. 14 illustrates an example of a display that constitutes selected elements of a graphical user interface (GUI) that is rendered on a display device in an embodiment according to the invention.

In an embodiment, the display 1400 includes, in essence, a rendering of a map showing a network of charging stations 1-5 represented by the GUI elements 1401, 1402, 1403, 1404, and 1405 (1401-1405), respectively. The charging stations 1-5 may be exemplified by any of the charging stations described herein. In an embodiment, the display 1400 indicates the positions of the charging stations relative to one another and relative to nearby landmarks (e.g., the building A) as well as the approximate locations of the charging stations in a parking lot. Priority charging stations (stations with a priority connection or channel) can also be designated in the map; in the example of FIG. 14, a letter "P" is placed proximate to a charging station that includes a priority connection or channel. As mentioned above, information included in the display 1400 can be sent to or accessed by remote devices such as smartphones. Thus, drivers can determine the locations of charging stations in the network. Also, in an embodiment, the GUI elements 1401-1405 can be used to indicate which of the charging stations has or may have an available output connection. In the example of FIG. 14, the GUI element 1401 is shaded to indicate that it has an output connection that may be available.

Figure 15:
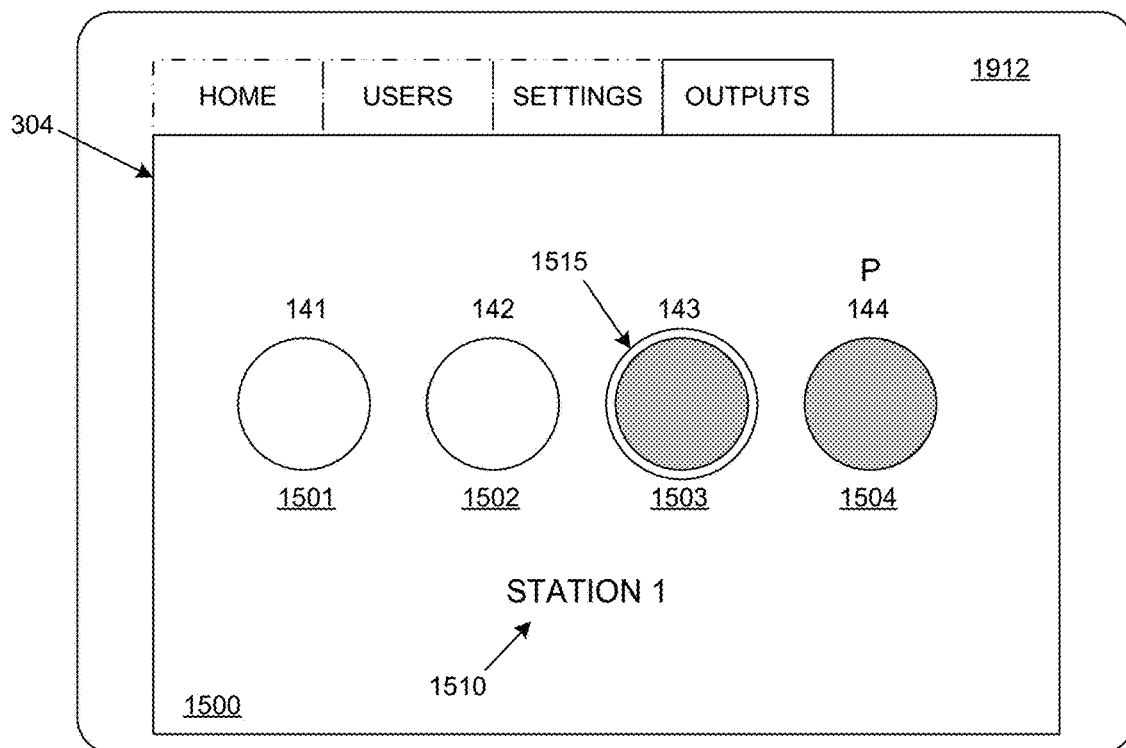
FIG. 15 illustrates an example of a display that constitutes selected elements of a GUI that is rendered on a display device in an embodiment according to the invention.
Figure 16:
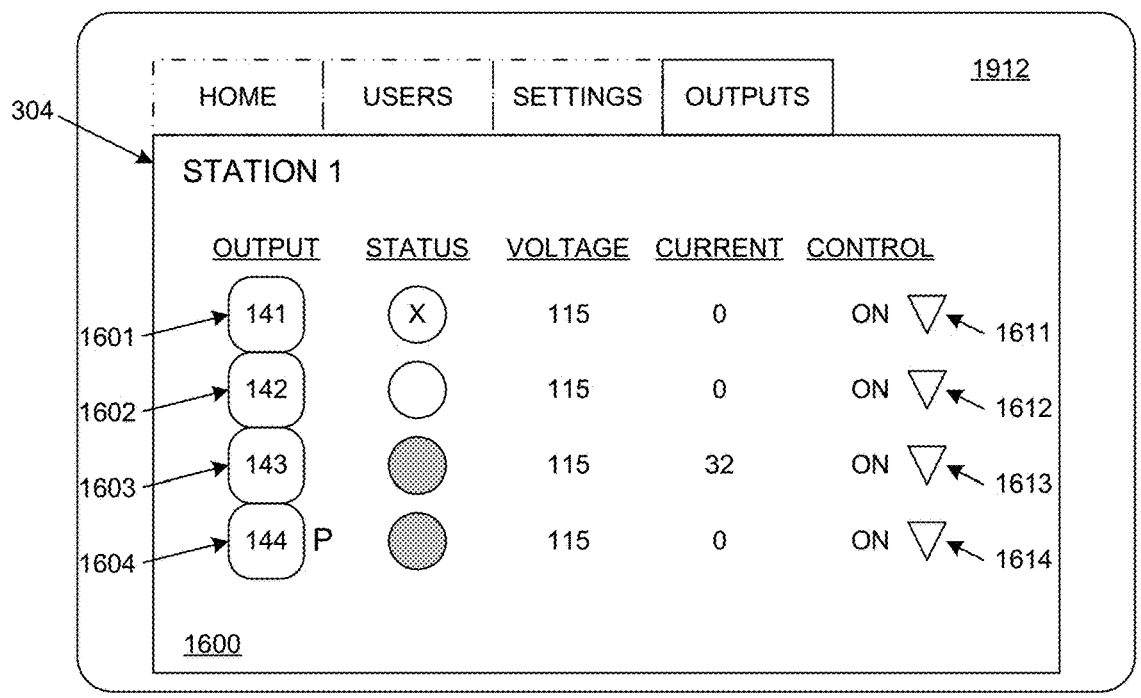
FIG. 16 illustrates an example of a display that constitutes selected elements of a GUI that is rendered on a display device in an embodiment according to the invention.

The GUI elements 1401-1405 can be individually selected (e.g., by clicking on one of them with a mouse, or by touching one of them on a touch screen). When one of the GUI elements (e.g., the element 1401, corresponding to station 1) is selected, the display 1500 of FIG. 15 is displayed on the display device 1912. The display 1500 includes GUI elements 1501, 1502, 1503, and 1504 (1501-1504) representing the output connections 141-144 of the selected charging station, as well as a GUI element 1510 that identifies the selected charging station.

The GUI elements 1501-1504 can be used to indicate which of the output connections is connected to an EV and which one of the output connections is currently providing a charging current to an EV. In the example of FIG. 15, the GUI elements 1503 and 1504 are colored, lit, or darkened to indicate that they are currently connected to an EV, and the GUI element 1503 is highlighted in some manner (e.g., encircled by the GUI element 1515) to indicate that the output connection 143 of station 1 is currently providing a charging current to an EV. In an embodiment, the GUI elements 1501-1504 include text to indicate the status of the respective output connections; for example, the word "active" can be displayed within a GUI element to indicate that the corresponding output connection is being used to charge an EV, and the word "standby" can be displayed within a GUI element to indicate that the corresponding output connection is available. Also, priority output connections can also be identified in some manner; in the example of FIG. 15, a letter "P" is placed proximate to the GUI element 1504 to indicate that the output connection 144 is a priority connection. As mentioned above, information included in the display 1500 can be sent to or accessed by remote devices such as smartphones. Thus, drivers can determine which charging stations in the network are in use and which are available. Alternatively, an alert of some type can be sent to the drivers' devices.

In an embodiment, the display 1600 is opened and displayed on the display device 1912 by selecting (clicking on or touching) the GUI element 1510. The display 1600 displays information for each of the output connections 141-144 of charging station 1. For example, the display 1600 can indicate the status of each of the output connections 141-144, to indicate which of the output connections is connected to an EV and which one of the output connections is providing a charging current to an EV, similar to what was described above. Other information, such as the voltage level and amperage for each output connection and the on/off status of each output connection, can also be displayed. Using the GUI elements 1611, 1612, 1613, and 1614, a user can individually turn off or turn on the output connections 141-144. Similar control mechanisms can be used to turn on and off individual charging stations and to turn on and off individual heads. Priority output connections can also be identified in some manner; in the example of FIG. 16, a letter "P" is placed proximate to the GUI element 1604 to indicate that the output connection 144 is a priority connection.

Figure 17:
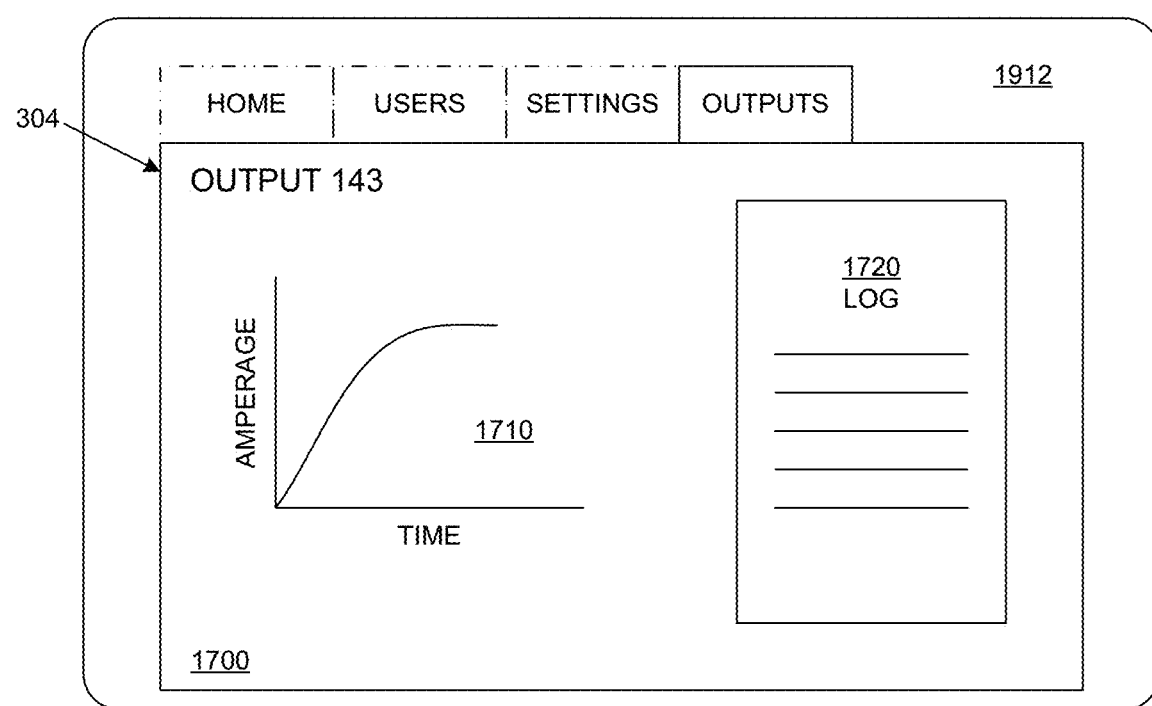
FIG. 17 illustrates an example of a display that constitutes selected elements of a GUI that is rendered on a display device in an embodiment according to the invention.

In an embodiment, the display 1600 includes a GUI element 1601, 1602, 1603, and 1604 (1601-1604) for the output connections 141-144, respectively. The GUI elements 1601-1604 can be individually selected (e.g., by clicking on one of them with a mouse, or by touching one of them). When one of the GUI elements (e.g., the element 1603, corresponding to the output connection 143) is selected, the display 1700 of FIG. 17 is displayed on the display device 1912. In an embodiment, the display 1700 includes a graph 1710 (a charge signature) that shows amperage versus time for the output connection 143. As mentioned above, information included in the display 1700 can be sent to or accessed by remote devices such as smartphones. Thus, using the charge signature, drivers can determine whether or not their vehicle has finished charging.

In an embodiment, the display 1700 also includes a log 1720. The log 1720 can display information such as a continuous log of events, with the last event on top. Events can include alerts, state changes, user-driven changes, device additions, and changes made by an event for each charging station, output connection, and/or channel. The log 1720, or a separate log, can include information such as charging data (charging signature) for each charge and amperage draw over time for charging stations, output connections, and/or heads. The charging data can include the length of each charging cycle (e.g., for each output connection, when charging an EV began and when it ended). The charging data can be used to identify and implement better charge and cycle durations.

With reference back to FIG. 14, the GUI 304 can include a settings tab that, when selected, can be used to open a display or window that allows a user to edit charging station settings such as the length of the charging interval for each output connection, set thresholds such as the charging threshold described above (FIG. 10), set alert thresholds and functions, and define additional information such as, for example, charging station name/label, description, and location. The GUI 304 can also include a users tab that can be used to authorize which users can use the multivehicle charging system and which users are currently using the system.

The GUI 304 can indicate alerts in any number of different ways. For example, a GUI element (not shown) can be displayed in the display 1400, or the GUI element 1401-1405 associated with a charging station that is experiencing a possible fault condition can be changed in some way (e.g., a change in color). Similarly, the GUI element 1501-1504 associated with an output connection that is experiencing a possible fault condition can be changed in some way (e.g., a change in color). Alerts can also be audio alerts.

Figure 18:
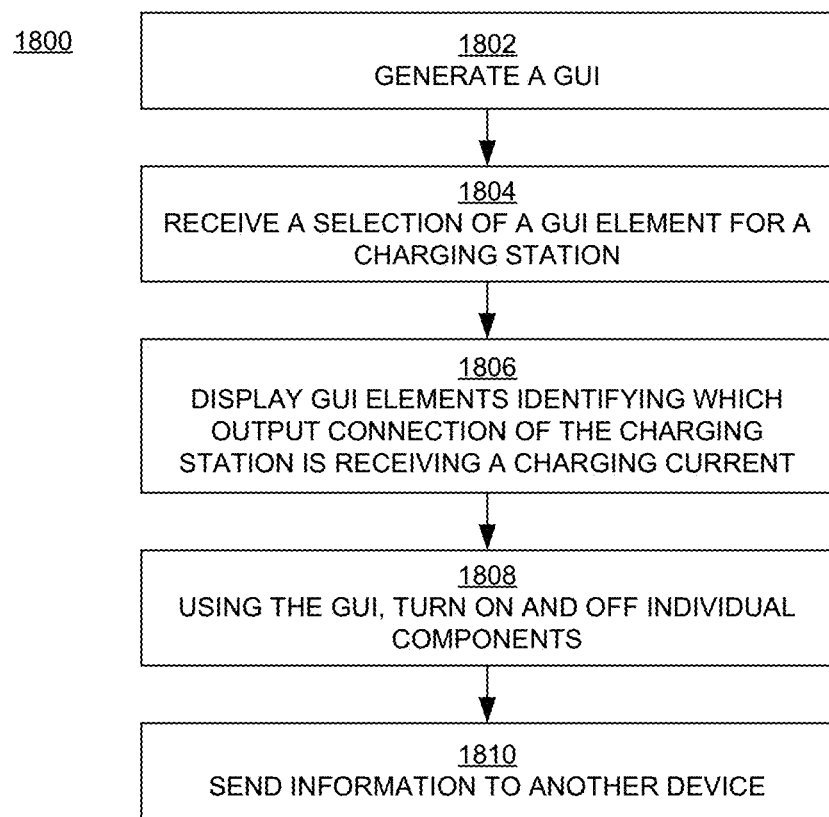
FIG. 18 is a flowchart illustrating examples of computer-implemented operations associated with monitoring and managing a network of EV charging stations in an embodiment according to the invention.

FIG. 18 is a flowchart 1800 illustrating examples of operations associated with monitoring and managing a network of EV charging stations in an embodiment according to the invention. These operations are generally described below, as details of these operations have already been described above.

In block 1802, with reference also to FIG. 14, a GUI (304) that includes a GUI element (1401-1405) for each of the charging stations in the network is generated.

In block 1804, a selection of a GUI element for a charging station is received.

In block 1806, based on the information received from the network of charging stations, GUI elements that identify which output connection of the charging station is receiving a charging current are displayed.

In block 1808, in response to commands received via the GUI (that is, responsive to user interaction with the GUI), components (e.g., the charging station itself, and/or output connections and heads of the charging station) of the network are individually turned on and off.

In block 1810, information that indicates the availability of the charging station and/or the availability of output connections and/or heads is sent to another device such as a smartphone.

Embodiments according to the present invention thus include, but are not limited to, the following features: multiple physical charging stations/connections per circuit; rotating (e.g., round-robin) charging; and automatic charging of multiple vehicles without user intervention.

Because only a single circuit is used for multiple charging stations/connections, costs are reduced. In other words, it is not necessary to pay for a dedicated circuit for each charging station, for example. New charging stations can be added at a reduced cost per station; more charging stations can be installed for the same cost. Existing infrastructure (e.g., an existing circuit) can be readily modified to accommodate multiple charging stations instead of a single station.

With more charging stations, vehicle charging is more convenient. For instance, vehicles will not have to be moved as frequently. From an employee's perspective, the availability of a convenient charging station at the workplace is a perk. From an employer's perspective, the availability of a convenient charging station may encourage employees to stay at work a little longer in order to get a free charge, plus employees' productivity may increase because they do not have to move their cars as frequently.

Figure 19:
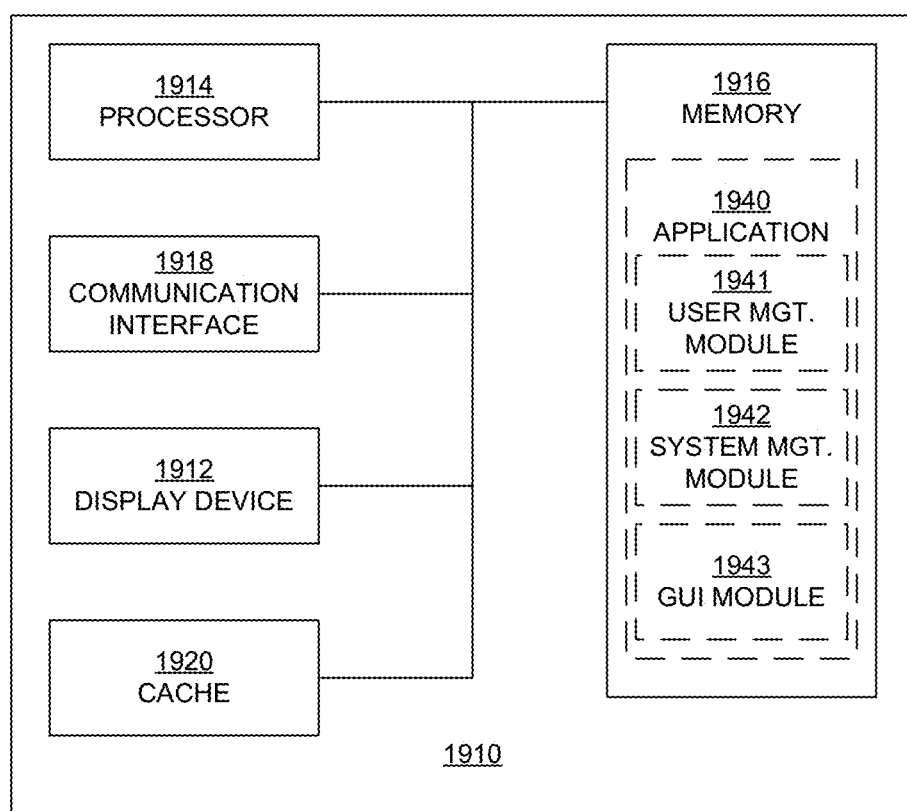
FIG. 19 is a block diagram of an example of a computing device or computer system capable of implementing embodiments according to the present invention.

FIG. 19 is a block diagram of an example of a computing device or computer system 1910 capable of implementing embodiments according to the present invention. The device 1910 broadly includes any single or multi-processor computing device or system capable of executing computer-readable instructions, such as those described in conjunction with FIGS. 2, 11, 12, 13, and 18. In its most basic configuration, the device 1910 may include at least one processing circuit (e.g., the processor 1914) and at least one non-volatile storage medium (e.g., the memory 1916).

The processor 1914 of FIG. 19 generally represents any type or form of processing unit or circuit capable of processing data or interpreting and executing instructions. In certain embodiments, the processor 1914 may receive instructions from a software application or module (e.g., the application 1940). These instructions may cause the processor 1914 to perform the functions of one or more of the example embodiments described and/or illustrated above.

The system memory 1916 generally represents any type or form of volatile or non-volatile storage device or medium capable of storing data and/or other computer-readable instructions. Examples of system memory 1916 include, without limitation, RAM, ROM, flash memory, or any other suitable memory device. In an embodiment, the system memory 1916 includes a cache 1920.

The device 1910 may also include one or more components or elements in addition to the processor 1914 and the system memory 1916. For example, the device 1910 may include a memory device, an input/output (I/O) device such as a keyboard and mouse (not shown), and a communication interface 1918, each of which may be interconnected via a communication infrastructure (e.g., a bus). The device 1910 may also include a display device 1912 that is generally configured to display a GUI (e.g., the GUI displays of FIGS. 14, 15, 16, and 17). The display device 1912 may also include a touch sensing device (e.g., a touch screen).

The communication interface 1918 broadly represents any type or form of communication device or adapter capable of facilitating communication between the device 1910 and one or more other devices. The communication interface 1918 can include, for example, a receiver and a transmitter that can be used to receive and transmit information (wired or wirelessly), such as information from and to the charging stations in a multivehicle charging system or network and information from and to other devices such as a smartphone or another computer system.

The device 1910 can execute an application 1940 that allows it to perform operations including the operations and functions described herein (e.g., the operations of FIGS. 11, 12, 13, and 18). A computer program containing the application 1940 may be loaded into the device 1910. For example, all or a portion of the computer program stored on a computer-readable medium may be stored in the memory 1916. When executed by the processor 1914, the computer program can cause the processor to perform and/or be a means for performing the functions of the example embodiments described and/or illustrated herein. Additionally or alternatively, the example embodiments described and/or illustrated herein may be implemented in firmware and/or hardware.

The application 1940 can include various software modules that perform the functions that have been described herein. For example, the application can include a user management module 1941, and system management module 1942, and a GUI module 1943. The user management module 1941 can perform functions such as, but not limited to, setting up user accounts that authorize users to use the multivehicle charging network, authenticating users, metering power consumed by each user, and optionally billing users. The system management module 1942 can perform functions such as, but not limited to, monitoring the availability and functionality of network components such as circuits, channels, output connections, heads, and charging stations, controlling (e.g., turning on and off) such components, monitoring charge signatures and charging periods (to rotate charging in, for example, round-robin fashion as described herein), collecting and logging network information, and performing diagnostics. The GUI module 1943 can perform functions such as, but not limited to, generating a GUI that can be accessed by a network administrator and can also be accessed by or pushed to other devices such as smartphones.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., storage as a service, software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. An electric vehicle (EV) charging system, comprising:
   a controller comprising a central processing unit and implemented on a single printed circuit board, the printed circuit board having a lower voltage side that powers the central processing unit (CPU), the printed circuit board also having a higher voltage side that receives an alternating current (AC) charging current delivered over a dedicated circuit from an AC power supply, wherein the CPU receives power from a lower voltage power supply that is separate from the AC power supply and that is not powered by the AC power supply, and wherein a voltage from the lower voltage power supply is less than a voltage from the AC power supply; and
   a plurality of output connections coupled to the controller, wherein each of the output connections is couplable to at least one head of a plurality of heads that are connectable to EVs, and wherein the output connections are numbered in sequence from one to N, where N is an integer;
   wherein the controller directs the AC charging current from the higher voltage side of the printed circuit board to a first one of the output connections if a first EV is connected to a head coupled to the first one of the output connections, wherein further the charging current to the first one of the output connections is subsequently stopped, switched to a second one of the output connections, and restarted if a second EV is connected to a head coupled to the second one of the output connections.

2. The EV charging system of claim 1, wherein the charging current is directed to the output connections in round-robin fashion one at a time in the sequence from one to N then back to one when multiple EVs are concurrently connected to the output connections.

3. The EV charging system of claim 1, wherein the charging current is directed to the first one of the output connections until a programmed length of a first interval of time expires, and wherein further the charging current is then stopped, restarted, and directed to the second one of the output connections until a programmed length of a second interval of time expires.

4. The EV charging system of claim 1, wherein the controller is further operable for determining, before the charging current is provided to an output connection, whether there is an electrical load coupled to the output connection, wherein the charging current is not directed to the output connection if there is not an electrical load coupled to the output connection.

5. The EV charging system of claim 1, wherein the controller is further operable for determining whether an EV coupled to the output connection requires charging, wherein the charging current is not provided to the output connection if the EV does not require charging.

6. The EV charging system of claim 1, wherein the controller is further operable for determining, before a charging current is provided to an output connection, whether the output connection is already drawing a current, and for indicating a fault condition when the output connection is drawing a current before the charging current is provided.

7. The EV charging system of claim 1, wherein the output connections comprise an output connection operable for delivering a charging current to a first head and a second head, wherein the charging current delivered through the output connection is split between the first and second heads if the first and second heads are concurrently connected to EVs.

8. The EV charging system of claim 1, further comprising a plurality of charging stations coupled between the output connections and the controller, wherein each of the charging stations is couplable to a head of the plurality of heads.

9. The EV charging system of claim 1, further comprising a charging station, wherein the output connections are coupled to the charging station through the controller.

10. A controller for an electric vehicle (EV) charging system, the controller comprising:
a processor, wherein the controller is implemented on a single printed circuit board having a lower voltage side that powers the processor, wherein the printed circuit board also has a higher voltage side that receives an alternating current (AC) charging current delivered over a dedicated circuit from an AC power supply, wherein the processor receives power from a lower voltage power supply that is separate from the AC power supply and that is not powered by the AC power supply, and wherein a voltage from the lower voltage power supply is less than a voltage from the AC power supply; and
a plurality of channels coupled to the processor, wherein each of the channels is couplable to at least one head of a plurality of heads that are concurrently connectable to EVs, and wherein the channels are numbered in sequence from one to N, where N is an integer;
wherein the controller directs the AC charging current from the higher voltage side of the printed circuit board to only one of the channels at a time if multiple EVs are concurrently connected to the heads, wherein a charging current is provided to a first one of the channels, the charging current to the first one of the channels is then turned off, and a charging current is then provided to a second one of the channels in accordance with a charging procedure.

11. The controller of claim 10, wherein the controller is operable for providing a charging current to each of the channels one channel at a time in round-robin fashion in the sequence from one to N then back to one and independent of when an EV is coupled to a channel.

12. The controller of claim 10, wherein the controller is operable for providing the charging current to the first one of the channels until a programmed length of a first interval of time, for turning off the charging current to the first one of the channels when the first interval of time expires, and for then providing the charging current to the second one of the channels until a programmed length of a second interval of time expires, in accordance with the charging procedure.

13. The controller of claim 10, wherein each channel of the channels is coupled to a respective output connection, and wherein each channel comprises a sensor selected from the group consisting of: a voltage sensor and a current sensor.

14. The controller of claim 13, wherein the controller is operable for detecting an electrical load coupled to a channel before a charging current is provided to the channel, wherein the charging current is not provided to the channel if there is not an electrical load coupled to the channel.

15. The controller of claim 13, wherein the controller is operable for detecting a charge signature for an EV coupled to a channel before a charging current is provided to the channel, wherein the charging current is not provided to the channel if the charge signature indicates that the EV is fully charged.

\* \* \* \* \*